United States Patent Office 2,761,977
Patented Sept. 4, 1956

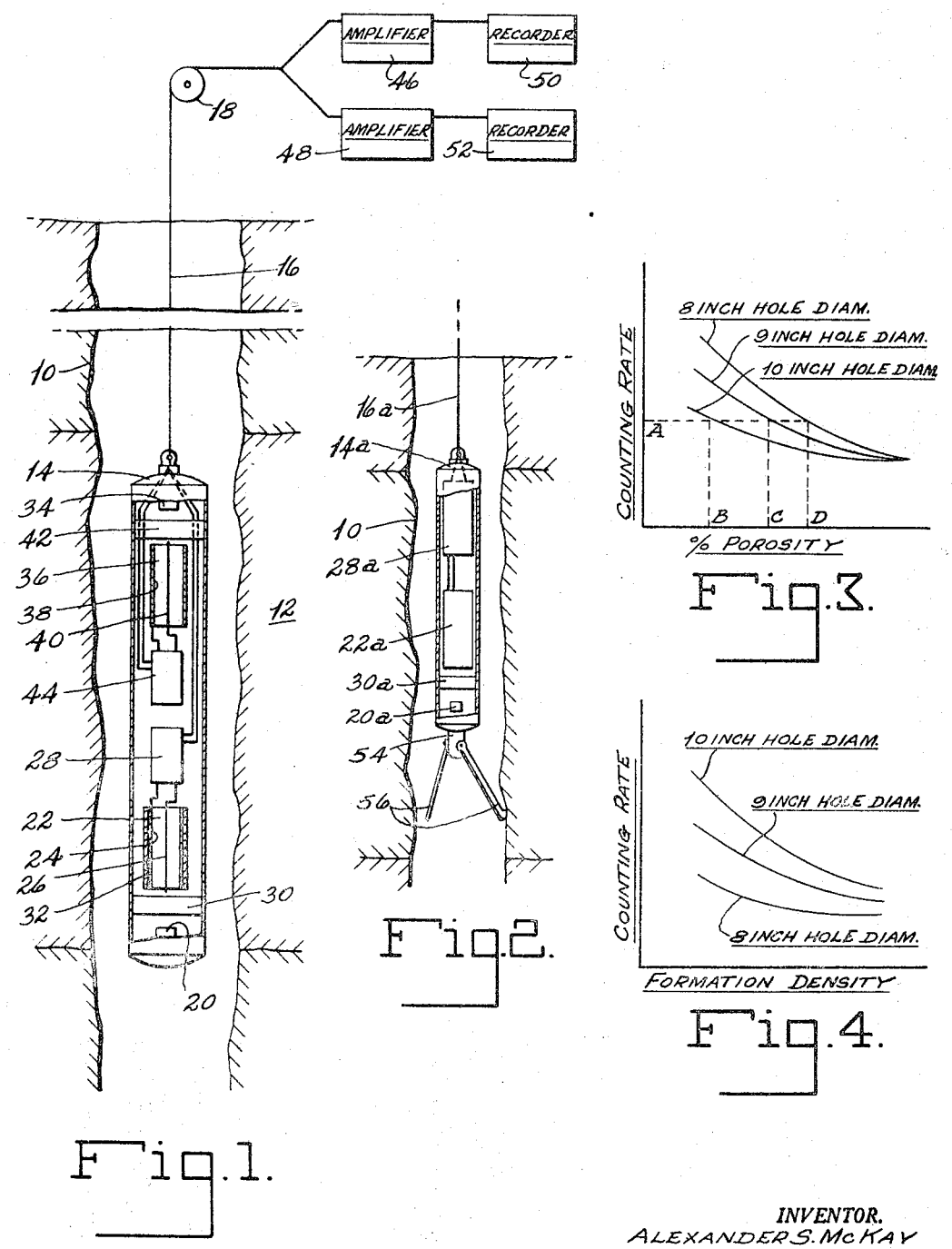

2,761,977
DETERMINING THE NATURE OF EARTH FORMATIONS

Alexander S. McKay, Bellaire, Tex., assignor to The Texas Company, New York, N. Y., a corporation of Delaware Application March 28, 1952, Serial No. 279,022

6 Claims. (Cl. 250—83.6)

This invention relates to the study of earth formations particularly those sub-surface formations traversed by a well or bore hole. The principal object of the invention is the provision of a method and a means for making radioactive logs of the earth's formations surrounding a bore hole while correcting inaccuracies which would normally arise due to variations in the diameter of the bore hole.

It is now well known that a so-called induced gamma ray or neutron-gamma ray log of a bore hole will provide information as to the porosities of the surrounding formations. In making a log of this type a source of neutrons which usually also emits gamma rays is passed through the hole together with means for detecting and measuring the intensities of gamma rays induced in the formations by neutron bombardment from the source. It is also known that the density of the formations surrounding the hole can be determined by means of a scattered gamma ray log. In making such a log a source of gamma rays is passed through the hole together with means for measuring the intensities of gamma rays originating in the source and scattered in formations traversed by the bore hole.

It has also recently been recognized that the conventional induced gamma ray log does not always provide accurate indications of the porosities of the formations since the counting rate or response of the induced gamma ray detector varies to an appreciable extent with variations in the diameter of the bore hole. The number of gamma rays induced in a formation by neutron bombardment thereof depends upon the amount of hydrogen in the formation and if the bore hole were of uniform size or diameter the induced gamma rays would provide a measurement of the hydrogen concentration and therefore of the porosities of the formations, providing the formation does not have chemically bound hydrogen in its structure and providing that the pore space is filled with liquid rather than gas. It has been shown by caliper logs that even those holes drilled through limestone show variations in diameter which are large enough to affect an induced gamma ray log appreciably. Likewise it has been found that the conventional scattered gamma ray log does not provide a true indication of the densities of the surrounding formations since this log also is affected appreciably by variations in bore hole diameter. That both the induced gamma ray logs and the scattered gamma ray logs are affected by bore hole diameter variations is understandable when it is considered that the hole is usually substantially full of hydrogen containing liquid. Thus, at a point or depth where the formation walls are "washed out" so that the hole has become enlarged, there will be a greater amount of liquid between the logging instrument and the formation walls and many of the measured gamma rays will be those which come from the liquid rather than from the earth formations. In the case of the induced gamma ray log, these last-mentioned gamma rays will not be gamma rays which are induced in the formations and which are indicative of the hydrogen content thereof and in the case of the scattered gamma ray log, they will not be indicative of the densities of the formations.

In accordance with the invention a method is provided whereby an induced gamma ray log or a scattered gamma ray log can be made simultaneously if desired, with another log showing variations in the diameter of the bore hole. The latter log can, if desired, be a more or less conventional caliper log in which a device having extending feelers or fingers is passed through the hole, these fingers contacting the walls of the formations and through suitable electrical circuitry providing a record of the changes in the hole diameter. It has recently been found that in a scattered gamma ray log a great deal of the detector response, perhaps a major portion thereof, is due to the presence of liquid in the hole and since the amount of liquid surrounding the logging instrument varies with the hole diameter a conventional scattered gamma ray log can be used as a caliper log.

In carrying out the invention in one form a logging instrument is provided which will make an induced gamma ray log and a scattered gamma ray log simultaneously. In another embodiment an induced gamma ray logging instrument has attached thereto a conventional hole calipering device so that as the instrument passes through the hole an induced gamma ray log and a caliper log will be made simultaneously. A set of curves will be made showing the counting rate or detector response as a function of the porosity of the earth formations for holes of different diameters. After a record is made showing the variation in bore hole diameter one can then refer to the curves to obtain a more accurate measure of porosity than was possible before the hole diameter was definitely known. In this manner the induced gamma ray log can be corrected for bore hole diameter to provide substantially a true porosity log of the formations.

For a better understanding of the invention, reference may be had to the accompanying drawing in which—

Figure 1 is a vertical elevation through a portion of a bore hole showing an instrument suspended therein for making simultaneously an induced gamma ray log and a scattered gamma ray log;

Figure 2 is a view somewhat similar to Figure 1, but showing an instrument for making simultaneously an induced gamma ray log and a caliper log;

Figure 3 is a curve or set of curves showing counting rate as a function of porosity for bore holes of different diameters, and Figure 4 is a set of curves showing counting rates as a function of formation density.

Referring to the drawing, a bore hole 10 is shown as traversing several subsurface formations such as that indicated at 12. Within the bore hole is an elongated instrument housing 14 suspended from the surface by means of the conductor cable 16 which passes over a suitable cable measuring device 18 for indicating the depth of the instrument in the hole. Within the housing 14 and substantially at the lower end thereof, is a source of neutrons 20 which may comprise a mixture of radium and beryllium. Disposed above the source 20 is a gamma ray detector 22 of the electrical pulse-producing type such as a conventional Geiger-Mueller counter or the high efficiency counter disclosed in the aforementioned Hare Patent No. 2,397,071. This detector is shown as comprising a cylindrical cathode member 24 with an anode wire 26 disposed along its longitudinal axis. The cathode 24 and anode 26 are, or course, mounted within a casing or shell (not shown) containing a suitable gas. The cathode and the anode are connected to a preamplifier 28, the output of which passes to the cable 16 and upwardly to the surface. Between the source 20 and the detector 22 is a layer 30 of gamma ray absorbing material such as lead, the purpose of which is to absorb gamma rays which would otherwise pass from the source 20 directly to the detector. The detector 22 is surrounded at its sides by a layer 32 of gamma ray absorbing material such as lead ¼ to ⅜ inch in thickness which serves to absorb a large portion of the gamma rays emitted by the source 22 and which are scattered in the surrounding material back toward the detector. It is preferred that the cathode 24 be formed of, or contain, a low atomic number metal such as brass, copper, aluminum or the like which is preferentially sensitive to the high energy gamma rays induced in the formation by the neutron bombardment, rather than to the low energy scattered gamma rays.

Disposed within the other end of the housing 14 is a gamma ray source 34 which may be radium or an artificially radioactive substance such as radioactive cobalt. This gamma ray source 34 is of the same strength in gamma ray emission as the gamma ray emitting portion of the source 20. In other words, the intensities of the gamma rays emitted from the two sources will be substantially the same. Below the source 34 is a gamma ray detector 36 also of the electrical pulse-producing type and which, like the detector 22, may be a conventional Geiger-Mueller counter or a high efficiency counter of the type disclosed in the aforementioned Hare patent. This detector is shown as comprising a cylindrical cathode 38 and an anode wire 40 disposed along its longitudinal axis. Between the source 34 and the detector 36 is a layer 42 of gamma ray absorbing material such as lead, the purpose of which is to prevent direct gamma rays from the source from striking the detector. The cathode 38 and anode 40 are connected to a suitable preamplifier 44, the output of which is conducted to the cable 16 and thence upwardly to the surface. It is preferred that the cathode 38 be formed of or contain a high atomic number metal such as lead, tantalum, bismuth or the like which is preferentially sensitive for the detection of the low energy gamma rays emitted from the source 34 and scattered within the surrounding formation back to the detector.

The cable 16 may contain several electrical conductors for conducting to the surface the outputs of the preamplifiers 28 and 44. At the surface the cable is connected to a pair of amplifiers 46 and 48 which are connected in turn to recorders 50 and 52.

In operation, while the instrument 14 is being passed through the hole 10 either in a downward or upward direction, as desired, neutrons from the source 20 penetrate the surrounding formations and, depending upon the nature of those formations, gamma rays may be induced therein, some of which pass backwardly toward the hole to strike the detector 22. Due to the provision of the shield 32 and the cathode 24 formed of a low atomic number metal, very few, if any, scattered gamma rays from the source 20 will be registered by the detector, as has been explained above. The output of the preamplifier 28 is further amplified by the amplifier 46 at the surface and passed to the recorder 50 which records the variations in the response of the detector 22, preferably in correlation with the indications of the depth of the instrument 14 in the hole. The record or log thus obtained may be used in determining the nature of the formations traversed by the hole.

Simultaneously with the making of the neutron-gamma ray log described in the foregoing paragraph, a scattered gamma ray log is made. Thus, the gamma rays from the source 34 penetrate the surrounding formations in which they are scattered and diffused, some returning to the hole to strike the detector 36. The response of this detector is preamplified at 44 and led to the surface where it is further amplified by means of the amplifier 48, the output of which passes to the recorder 52. The two detectors 22 and 36 will also respond to gamma rays naturally emitted by the formations, but their effect can be neglected if the sources 20 and 34 are made reasonably strong.

As has already been stated, it has been found experimentally that where the distance between the source 34 and the detector 22 and the distance between the source 20 and the detector 36 is six feet or more, the gamma rays from the source 34 will be absorbed before they can reach the detector 22 and likewise the gamma rays from the neutron-gamma ray source 20 will be absorbed before they can reach the detector 36. Thus, there will be substantially no interference between the two effects being measured. The separation between the sources and the detectors can be taken into consideration when the logs are studied or one log can be displaced longitudinally with respect to the other log so that formational changes will appear opposite each other on the two logs, if desired.

Although a multi-conductor cable 16 has been described, it is contemplated that the preamplified detector outputs may be conducted to the surface over a single conductor cable and that the single conductor of the cable may also conduct downwardly to the instrument 14 the electrical energy necessary for the operation of the detector and other elements.

As has been stated hereinbefore the scattered gamma ray log produced by the recorder 52 can be used as a caliper log and the record suitably calibrated so that readings of bore hole diameter can be taken directly therefrom. In referring to Figure 3 it can easily be seen that the counting rate A from the induced gamma ray record will provide but little information as to the porosities of the formations unless the diameter of the bore hole is also known. Having made the scattered gamma ray log one can then refer to the curves and obtain the true porosity from the curve representing the bore hole diameter at any particular depth. Thus assuming that the induced gamma ray counting rate A were obtained at a point where the scattered gamma ray log shows that the hole is 9 inches in diameter, then a porosity reading at that depth would be that indicated at C rather than at B or D.

In Figure 2, the instrument housing 14a is suspended from a cable 16a and contains a neutron source 20a, a shield 30a, an induced gamma ray detector 22a and a preamplifier 28a, these elements corresponding to the elements having similar numbers without the suffixes in Figure 1. Shown as attached to the bottom of the housing 14a is a calipering device 54 of any suitable conventional type, this device usually having three outwardly spring-tensioned fingers 56 pivotally mounted at one end and preferably spaced 120° apart and adapted to rub along the walls of the hole. As is well known, as these fingers 56 move outwardly and inwardly due to variations in the hole diameter they produce corresponding variations in an electrical circuit and a log or record of these variations as the instrument is pulled through the hole constitutes a caliper log of the hole. As has been explained in reference to Figures 1 and 3 the hole diameter readings produced by the device 54 can be correlated with the induced gamma ray counting rate from the detector 22a by reference to the curves of Figure 3 so that a true induced gamma ray log of the formations will be produced.

As has been mentioned hereinabove, by making simultaneously a scattered gamma ray log and a caliper log information can be had which will be a true indication of variations in the density of the formations. Thus, with reference again to Figure 2, in this case the source 20a will be a source of gamma rays and the detector 22a will detect gamma rays originating in the source and scattered in the surrounding material. By comparing the scattered gamma ray log thus obtained with the caliper log obtained by the device 54 and referring to curves such as those in Figure 4 in which counting rate is plotted as a function of formation density, the true densities of the formations may be obtained throughout the bore hole.

In Figure 2 although the surface connections are not shown, it is understood that they will be similar to those for Figure 1. Thus, the cable 16a will be connected to an amplifier for the scattered gamma rays from the detector 22a and to a suitable recorder and the same cable will also conduct upwardly the response of the caliper instrument 54 which will be simultaneously recorded in log form.

Obviously many other modifications and variations of the invention, as hereinbefore set forth, may be made without departing from the spirit and scope thereof, but only such limitations should be imposed as are indicated in the appended claims.

I claim:

1. The method of making an improved induced gamma ray log of earth formations traversed by a bore hole which comprises passing through the hole a neutron source of the type which also emits gamma rays so as to bombard said formations with neutrons and gamma rays, simultaneously measuring with a single detecting means the combined intensities of gamma rays induced in the formations due to said neutron bombardment and gamma rays originating in said source and scattered in material surrounding the source and detecting means, separately measuring with a second detecting means the intensity of the said scattered gamma rays originating in a gamma ray source equivalent in gamma ray emission to said first named source so as to produce a log of the variations in the size of the bore hole, and from a knowledge of the variation in intensity of induced gamma ray emission with bore hole size utilizing the second named measurements to correct the first named measurements to produce an induced gamma ray log substantially free of variations in size of the bore hole.

2. The method of making an improved induced gamma ray log of earth formations traversed by a bore hole which comprises passing through the hole a neutron source of the type which also emits gamma rays so as to bombard said formations with neutrons and gamma rays, simultaneously measuring with a single detecting means the combined intensities of gamma rays induced in the formations due to said neutron bombardment and gamma rays originating in said source and scattered in material surrounding the source and detecting means, separately measuring by a second detecting means the intensity of the said scattered gamma rays alone to produce a log of the variations in the size of the bore hole and from a knowledge of the variation in intensity of induced gamma ray emission with bore hole size utilizing the second named measurements to correct the first named measurements to produce an induced gamma ray log substantially free from the effects of variations in size of the bore hole.

3. The method of making an improved scattered gamma ray density log of earth formations traversed by a bore hole which comprises passing a source of gamma rays through said hole, measuring with a single detecting means those gamma rays from the source which are scattered in the surrounding earth formations and returned to be intercepted by said detecting means and those gamma rays from the source which are scattered in the material in the bore hole surrounding the source and intercepted by the said detecting means, making a caliper log of the variations in diameter of the bore hole and from the data obtained from said caliper log correcting the scattered gamma ray log to produce a log of the densities of the formations substantially free from the effects of variations in bore hole diameter.

4. The method described in claim 3 in which the caliper measurements are made simultaneously with and at substantially the same depths in the hole as gamma ray measurements.

5. The method of making an improved induced gamma ray log of earth formations traversed by a bore hole which comprises passing through the hole a neutron source of the type which also emits gamma rays so as to bombard said formations with neutrons and gamma rays, simultaneously measuring with a single detecting means the combined intensities of gamma rays induced in the formation due to said neutron bombardment and gamma rays originating in said source and scattered in material surrounding the source and detecting means, separately measuring by a second detecting means the amount of fluid in the bore hole in the vicinity of said source and first mentioned detecting means to produce a log of the variations in the size of the bore hole and from a knowledge of the variation in intensity of induced gamma ray emission with bore hole size utilizing the second named measurements to correct the first named measurements to produce an induced gamma ray log substantially free from the effects of variations in size of the bore hole.

6. The method of making an improved scattered gamma ray density log of earth formations traversed by a bore hole which comprises passing a source of gamma rays through said hole, measuring with a single detecting means those gamma rays from the source which are scattered in the surrounding earth formations and returned to be intercepted by said detecting means and those gamma rays from the source which are scattered in the material in the bore hole surrounding the source and intercepted by the said detecting means, measuring the amount of fluid in the bore hole in the vicinity of said source and detector so as to make a log of the variations in diameter of the bore hole and from the data obtained from said last mentioned log correcting the scattered gamma ray log to produce a log of the densities of the formations substantially free from the effects of variations in bore hole diameter.

References Cited in the file of this patent

UNITED STATES PATENTS

| | | |
|---|---|---|
| 2,369,672 | Hare | Feb. 20, 1945 |
| 2,385,378 | Piety | Sept. 25, 1945 |
| 2,469,463 | Russell | May 10, 1949 |
| 2,475,137 | Herzog | July 5, 1949 |
| 2,648,780 | Herzog | Aug. 11, 1953 |